July 8, 1952  G. W. JOHNSON  2,602,186
POULTRY SCALDING MACHINE
Filed July 12, 1948  4 Sheets-Sheet 1
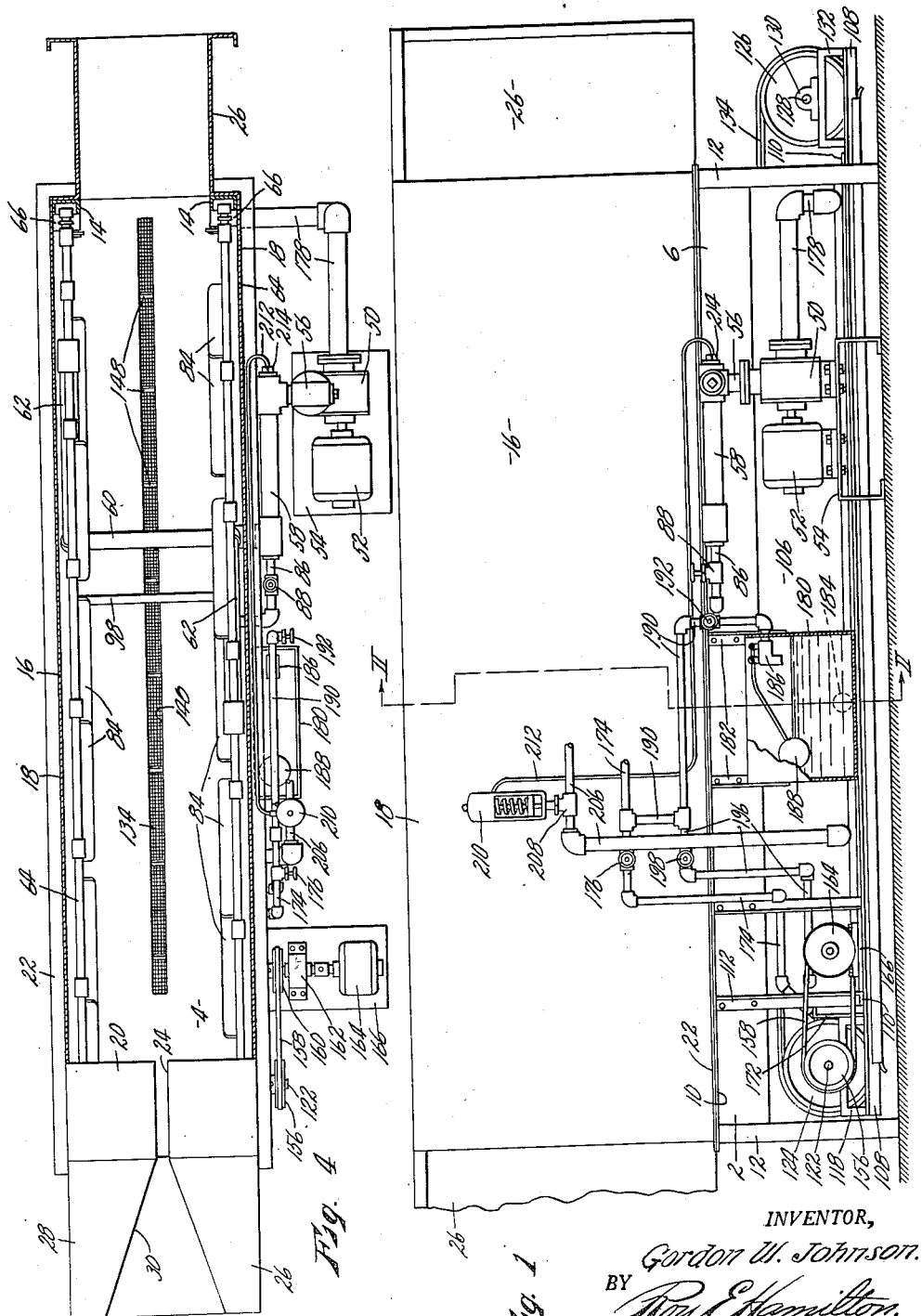
INVENTOR,
Gordon W. Johnson.
BY Roy E. Hamilton,
Attorney.

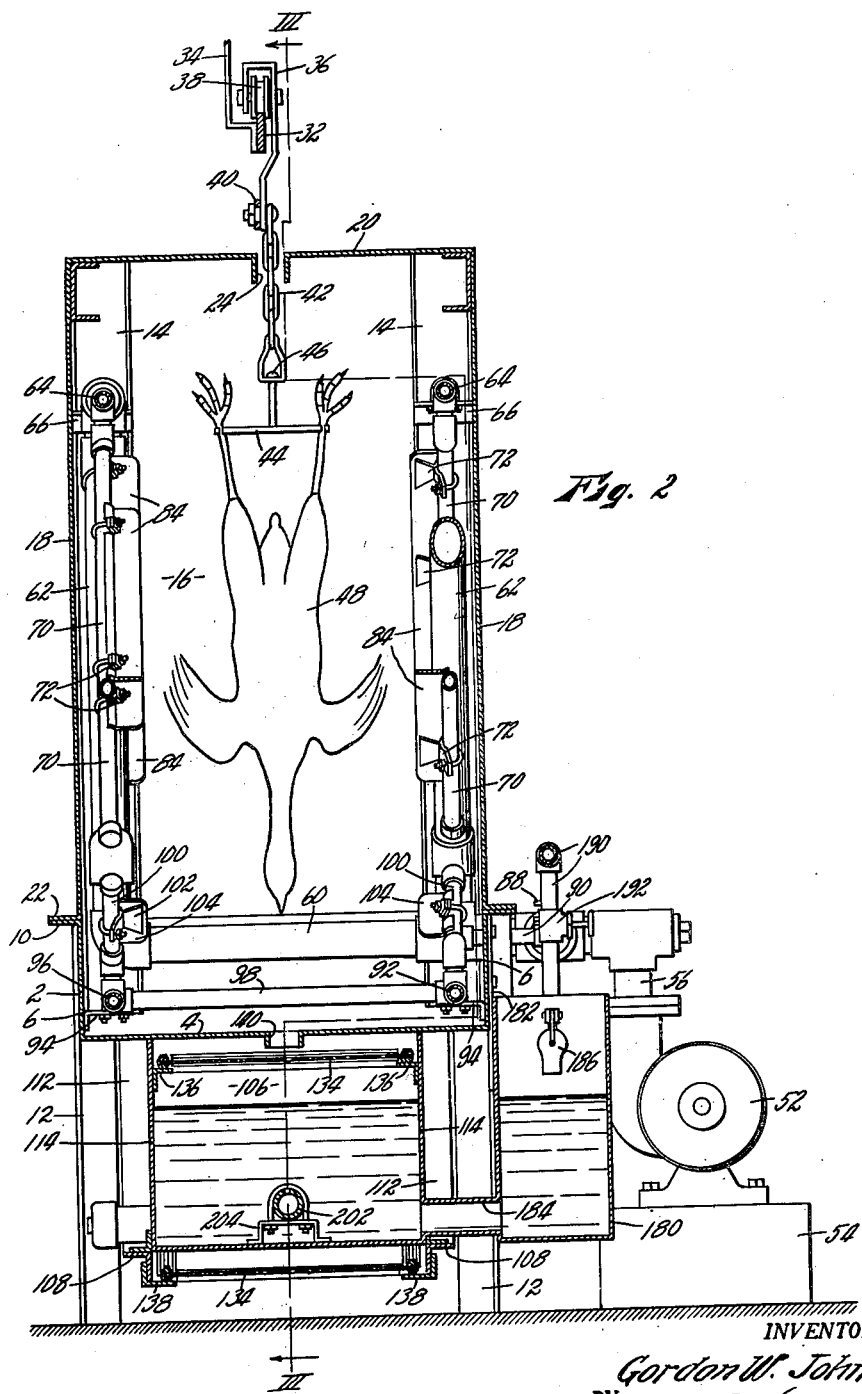

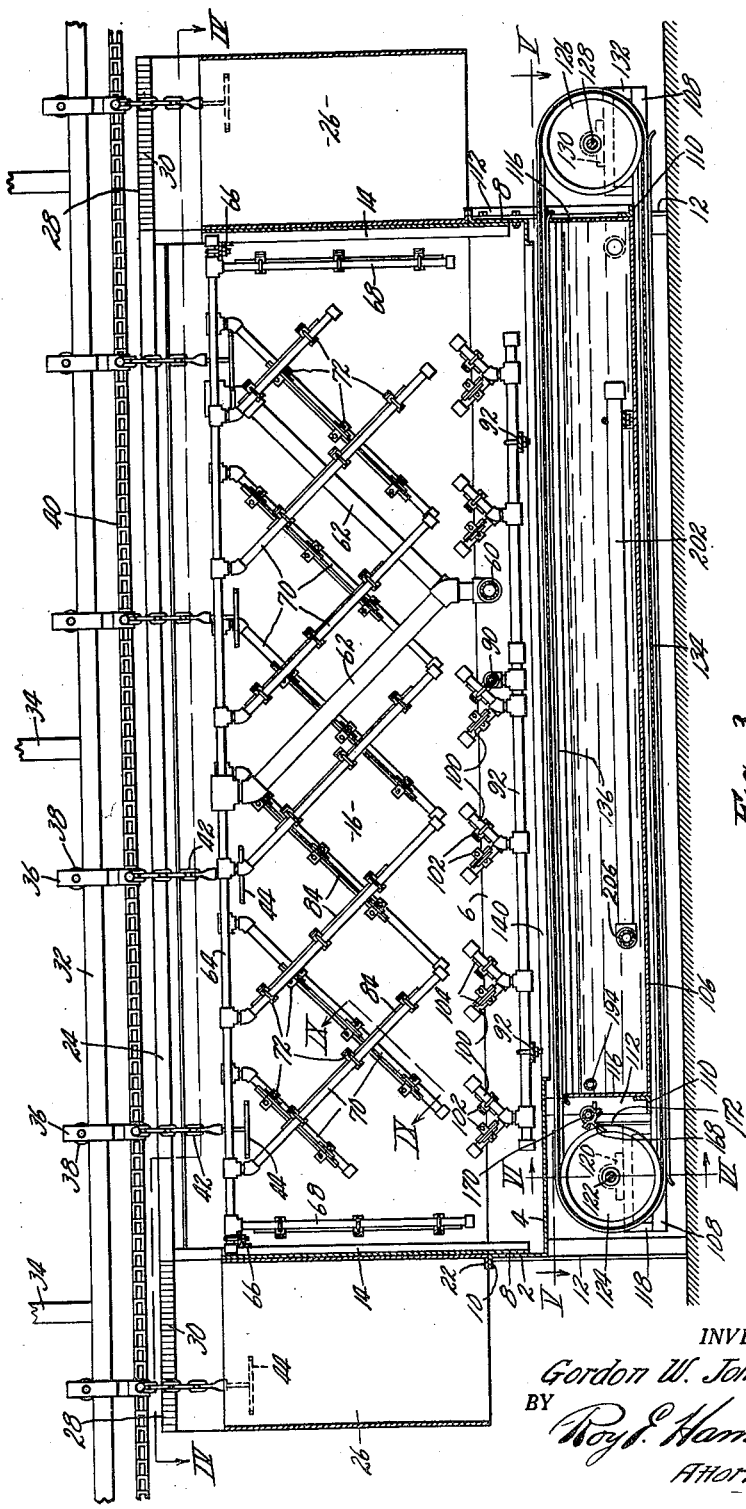

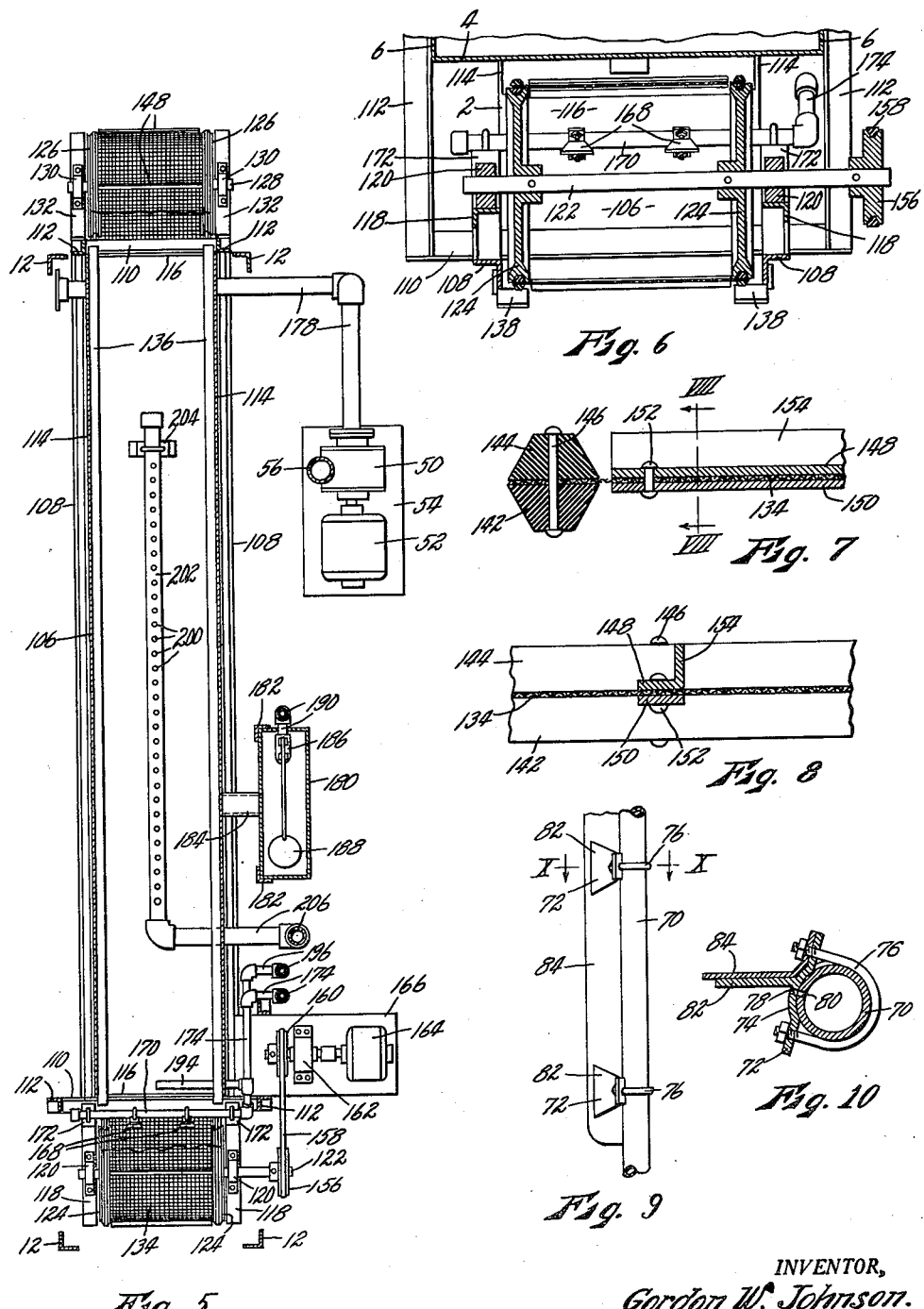

Patented July 8, 1952

2,602,186

UNITED STATES PATENT OFFICE 2,602,186

POULTRY SCALDING MACHINE

Gordon W. Johnson, Kansas City, Mo., assignor to Gordon Johnson Company, Kansas City, Mo., a corporation of Missouri Application July 12, 1948, Serial No. 38,299

6 Claims. (Cl. 17—11.2)

This invention relates to new and useful improvements in a poultry scalder, and has particular reference to an apparatus for scalding poultry as it is moved along a conveyor line.

The principal object of the present invention is the provision, in a poultry scalder having a cabinet and suitable sprays therein adapted to be directed against poultry as said poultry is moved through said cabinet, of a traveling screen disposed beneath said cabinet and through which scalding fluid draining from said poultry passes for the removal of feathers, manure, clotted blood and other waste matter therefrom, and means for cleaning said waste material from said screen at a suitable disposal point.

Another object is the provision of a poultry scalder comprising a cabinet through which poultry is adapted to be passed by a traveling conveyor, spray heads carried in said cabinet for spraying scalding fluid against said poultry, means for delivering scalding fluid to said spray heads, a screen belt disposed beneath said cabinet so that scalding fluid draining from said poultry passes therethrough for the removal of waste material therefrom, means for driving said belt, suitable spray heads disposed on the opposite side of said screen whereby sprays are directed through said screen to remove said waste material therefrom, and means for recirculating said strained scalding fluid to said first named spray heads.

A further object is the provision, in a poultry scalder having a cabinet through which poultry is moved on a suitable conveyor, of spray heads disposed in said cabinet at each side of the line of travel of said poultry and adapted to direct thin, sheet-like sprays of scalding fluid inwardly against said poultry, the planes of said sprays being inclined relative to the direction of travel of the poultry and the planes of the sprays at opposite sides of the cabinet being disposed angularly to each other. Since each spray travels vertically along the bird as well as horizontally, and since when the bird is swung about by the sprays, the sprays from the opposite side strike the bird angularly to the other sprays, this spray arrangement has been found to produce thorough scalding.

Other objects are simplicity and economy of construction, efficiency and dependability of operation, and adaptability to scald poultry of all sizes.

With these objects in view, as well as other objects which will appear in the course of the specification, reference will be had to the drawing, wherein:

Figure 1 is a side elevation of a poultry scalder embodying the present invention, with parts broken away.

Fig. 2 is an enlarged section taken on line II—II of Fig. 1, showing a fowl suspended in the spray cabinet by means of a suitable conveyor.

Fig. 3 is a reduced section taken on line III—III of Fig. 2.

Fig. 4 is a section taken on line IV—IV of Fig. 3, with the conveyor and poultry omitted.

Fig. 5 is a section taken on line V—V of Fig. 3, with the screen belt partially broken away.

Fig. 6 is an enlarged fragmentary section taken on line VI—VI of Fig. 3.

Fig. 7 is an enlarged fragmentary transverse section of the edge portion of the screen belt.

Fig. 8 is a fragmentary section taken on line VIII—VIII of Fig. 7.

Fig. 9 is an enlarged section taken on line IX—IX of Fig. 3, showing a portion of one of the spray pipes and the spray heads attached thereto.

Fig. 10 is an enlarged section taken on line X—X of Fig. 9.

Like reference numerals apply to similar parts throughout the several views, and the numeral 2 applies to a rectangular tank open at the top and having a bottom 4, side walls 6, and end walls 8. An outwardly turned flange 10 is provided at the upper edges of said side and end walls. Said tank is supported above the floor by legs 12 rigidly attached to said tank at the corners thereof. Four channel iron corner members 14 are rigidly fixed in the corners of tank 2 and extend vertically upwardly therefrom, supporting a rectangular spray cabinet 16 which is substantially coextensive with tank 2 and which comprises side walls 18 and top 20, said side walls having outwardly turned flanges 22 along their lower edges, said flanges being rigidly attached to flanges 10 of tank 2 thus, the bottom 4 of tank 2 constitutes also the bottom of cabinet 16. Top 20 of said cabinet is slotted longitudinally along its midline at 24 to provide for the passage of the fowl supporting chains as hereinafter described. Said cabinet is also provided with longitudinal extensions 26 at each end to prevent splashing of the sprays from the open ends of the cabinet. The tops 28 of said extensions are provided with inwardly convergent guide slots 30 communicating at their inner ends with slot 24, slots 30 being adapted to direct the fowl supporting chains into slot 24.

The scalder is adapted to be positioned with slot 24 substantially beneath and parallel to a conveyor rail 32, said rail being supported by hangers 34. A plurality of brackets 36 each carry for rotation a roller 38 adapted to roll along said rail. Said brackets are secured in spaced relation along said rail, and moved along said rail, by a conveyor chain 40 connecting the downwardly extended ends of said brackets. Suspended from each of said brackets is a chain 42 which hangs downwardly through slot 24 and carries at its lower end a poultry shackle 44 supported by a swivel connection 46. Said shackle may be of any type suitable for engaging the legs of a fowl 48, as best shown in Fig. 2.

A pump 50, and an electric motor 52 adapted to drive said pump, are mounted on a base 54 disposed adjacent one side of tank 2. The delivery pipe 56 of said pump is connected by means of pipe 58 with a horizontal pipe 60 which extends into tank 2 through one of the side walls 6 thereof and which extends transversely through said tank to a point adjacent the opposite wall thereof. Connected to pipe 60 are a pair of upwardly inclined pipes 62, said pipes being disposed respectively adjacent the inner surfaces of spray cabinet side walls 18. It will be noted in Fig. 3 that pipes 62 are inclined in opposite directions so as to be substantially at right angles to each other, and are each interconnected at their upper ends with a horizontal pipe 64 extending longitudinally in cabinet 16 and rigidly attached at its ends to brackets 66 fixed to corner members 14. Pipes 64 are disposed adjacent the upper edge of the spray cabinet. A vertically downwardly extending spray tube 68 is interconnected with each pipe 64 adjacent each end thereof, and a plurality of downwardly inclined spray tubes 70 are interconnected with each pipe 64 intermediate its ends. Spray tubes 70 at opposite sides of the spray cabinet are inclined oppositely so as to be substantially at right angles to each other, as best shown in Fig. 3.

A plurality of spray heads 72 are carried in spaced relation of each of spray tubes 68 and 70. As shown in Figs. 9 and 10, each of said spray heads comprises a body member 74 clamped to the spray tube by a U-bolt 76 and having a hole 78 formed therethrough in registering relation with a hole 80 formed in the tube wall. A deflector plate 82 integral with body member 74 deflects water or other scalding fluid passing through hole 78 into a thin, sheet-like spray. Poultry passing before said sprays are prevented from being scratched, torn, or otherwise damaged by said spray heads by a guard plate 84 secured by U-bolts 76 and extending outwardly beyond the outer ends of deflector plates 82. Said spray heads are adapted to direct thin sprays inwardly against poultry as it is moved through the cabinet, and since the planes of the sprays are parallel to spray tubes 70 which are inclined relative to the direction of travel of the birds, said sprays will travel vertically along each bird as well as transversely. Furthermore, as a bird is swung about on swivel 46 by the sprays, the sprays from opposite sides of the cabinet strike the bird at different angles. This spray arrangement has been found very efficient in providing thorough scalding of poultry, even with large and heavily feathered birds.

A pipe 86 provided with a hand operated valve 88 is interconnected at one end with pipe 58 outside of tank 2, and at its opposite end with a pipe 90 extending into tank 2 through side wall 6 and interconnected at its inner end with a horizontal pipe 92 extending longitudinally in tank 2 and mounted to side wall 6 thereof by means of brackets 94. A similarly mounted pipe 96 extending along the opposite side of tank 2 is interconnected with pipe 92 by means of a pipe 98 extending transversely across tank 2 adjacent the bottom thereof. Pipes 92 and 96 are provided with upwardly extending, oppositely inclined spray tubes 100 fitted with spray heads 102 and guard plates 104 substantially in the same manner as spray tubes 70, except that spray tubes 100 each carry only one spray head. Spray heads 102 may thus be supplied with scalding fluid independently of spray heads 72 by opening or closing valve 88, and are adapted to be used only when turkeys or other large poultry which hang low in the spray cabinet are being scalded.

A rectangular reservoir tank 106 is disposed longitudinally beneath tank 2 and is supported by a frame comprising a pair of horizontal angle irons 108 extending longitudinally beneath tank 2, said angle irons being connected adjacent their ends by crosspieces 110, and said crosspieces being supported by upwardly extending supports 112 rigidly fixed at their upper ends to tank 2. The side walls 114 of tank 106 contact the bottom of tank 2, while the end walls 116 of said tank are spaced below the bottom of tank 2. Angle irons 108 extend outwardly from each end of tank 106. At the left end of the machine, as viewed in Fig. 1, brackets 118 are mounted on the extended portions of said angle irons. Said brackets carry bearings 120 which in turn carry rotatably a horizontal shaft 122 extending transversely. A pair of spaced apart sheave wheels 124 are rigidly mounted on said shaft between said bearings. At the right end of the machine, corresponding sheave wheels 126 are rigidly mounted on a shaft 128 carried for rotation in bearings 130 mounted on brackets 132 fixed to the extended end portions of angle irons 108.

An endless belt 134 of flexible screen material is disposed operatively about sheave wheels 124 and 126, the upper reach of said belt passing over the upper edges of end walls 116 of tank 106 and adjacent the bottom of tank 2, being supported along its edges by tracks 136 fixed to the side walls 114 of said tank adjacent the upper edge thereof, and the lower reach of said belt passing beneath tank 106 and being supported along its edges by tracks 138 carried by angle irons 108. An elongated slot 140 is formed longitudinally in the bottom of tank 2, through which scalding fluid draining from the poultry in the spray cabinet may pass, passing thence through screen belt 134 and into tank 106. As best shown in Figs. 7 and 8, the edge portions of the belt are bound by flexible strips of rubber 142 and 144 secured to opposite sides of the screen by any suitable means such as rivets 146, the inner strip 142 serving as a means for engaging sheave wheels 124 and 126, and the outer strip 144 serving as a dam to prevent water flowing through slot 140 from washing over the edges of the screen. It will be noted that the screen is substantially wider than slot 140, so that should the central portion of the screen become clogged by waste material strained from the water, the water will flow outwardly from the slot and pass through the screen before reaching the edges thereof. At regularly spaced intervals along belt 134, metallic strips 148 and 150 are disposed respectively at opposite sides of said screen and extend transversely thereof, and are rigidly joined by rivets 152. Said strips serve as transverse stiffeners for the screen, and the outer strip 148 is provided with an outwardly turned flange 154 adapted to obstruct longitudinal flow of water along the screen.

Shaft 122 is extended transversely outwardly, and to its extended end is fixed a pulley 156, said pulley being operatively connected by means of belt 158 with a pulley 160 fixed to the output shaft of a gear reduction unit 162 which is in turn driven by electric motor 164. Said gear reduction unit and said motor are mounted on a platform 166 carried by one of angle irons 108. By means of said motor, screen belt 134 is moved slowly beneath slot 140, the upper reach of said belt moving to the left as viewed in Fig. 3. The feathers, manure, blood, saliva, and other waste carried by said screen are thus constantly moved toward the left end of the machine.

Screen belt 134 is cleaned by sprays of cold water issuing from a pair of spray heads 168 similar to spray heads 72 and passing outwardly through said belt just after the belt passes around sheave wheels 124, thus discharging the waste material downwardly to the floor where it may conveniently be washed away. Said spray heads are carried by a spray tube 170 extending transversely through the loop formed by belt 134 just to the right of sheave wheels 124, and said spray tube is mounted firmly on brackets 172 carried by angle irons 108. Said spray tube is interconnected by means of pipe 174 with a suitable source of cold water, said pipe having a hand operated valve 176 therein for controlling the flow of spray heads 168.

Water draining into tank 106 through screen 134 is returned to the intake of pump 50 by means of pipe 178 for recirculation to spray heads 72 and 102. Since water is carried out of the scalder in the feathers of the poultry, means must be provided for continually adding water. For this purpose a float chamber 180 is suspended from tank 2 by supports 182 substantially at the same elevation as tank 106, and is directly interconnected with tank 106 by a pipe 184 extending between the lower portions thereof, whereby the liquid level in said tank and float chamber is maintained equal. A float valve 186 carried in the upper portion of said float chamber and controlled by a float 188 disposed on the surface of the liquid in said chamber, is interconnected by means of pipe 190 with cold water supply pipe 174, pipe 190 being fitted also with a hand operated control valve 192. Whenever the liquid level in chamber 180 falls, float valve 186 will be opened to allow water to flow into float chamber 180 and thence into tank 106 through pipe 184. An auxiliary filler tube 194 extends into tank 106 through side wall 114 thereof, and is interconnected by means of pipe 196 and pipe 190 with cold water supply pipe 174. Pipe 196 is provided with a hand operated control valve 198, by means of which the flow of water through auxiliary filler tube 194 may be controlled independently. Said filler tube may be used for filling tank 106 initially, or may be opened when birds are being passed through the machine at a high rate of speed in order to supplement the flow through float valve 186.

The water is heated by steam passing outwardly through perforations 200 in a steam pipe 202 disposed longitudinally in tank 106 adjacent the bottom thereof, and supported by a bracket 204 fixed to the bottom of said tank. Said steam pipe is interconnected with a pipe 206 which extends outwardly from tank 106 and is adapted to be connected with a suitable source of steam. The flow of steam through pipe 206 is regulated by a valve 208 operable by a suitable thermostatically operable control 210 of standard type, said control being interconnected by means of conduit 212 with a pressure type thermostat 214 carried in delivery pipe 58 of pump 50. By means of said thermostatically operable valve, sufficient steam may be admitted to tank 106 to maintain the water therein at any desired temperature. In this connection, it is to be noted that the term "scalding," as used in this application, does not mean boiling but refers to the temperature at which it has been found most advantageous to maintain the scalding fluid. A temperature of 128–130 degrees Fahr. has been found to provide loosening of the feathers without burning, cooking, or otherwise injuring the bird.

Thus a poultry scalder having definite advantages has been produced. Heretofore the use of stationary straining screens in recirculating systems has necessitated frequent stoppages for cleaning the screens, which clogged rapidly due to the large amount of waste material in the water. Furthermore, stationary screens were necessarily large in order to provide sufficient capacity when partially clogged, and the reservoir tanks were consequently large. Also the scalding water was constantly passed through accumulated waste and was thus unsanitary. These objections are all obviated by this invention. Since freshly cleaned screen is presented at all times for straining the water, the water passes through freely, and with a minimum of contamination, and the effective screen area and the reservoir tank may be small, thus providing economy. The operation is continuous. Also, since tank 106 is relatively small, the water is completely replaced every few minutes of operation, thus further increasing the cleanliness of the scalding sprays.

What I claim is:

1. A poultry scalder comprising a bottomed spray cabinet, means carried in said cabinet for directing sprays of scalding liquid against poultry disposed in said cabinet, said cabinet having a relatively narrow, elongated slot formed through the bottom thereof, a relatively broad endless screen belt carried beneath said cabinet and having a reach adapted to travel continuously beneath and parallel to said slot, liquid draining from said cabinet being adapted to pass through said slot and said screen for the removal of waste material therefrom, means for continuously removing said waste material from said belt at a zone of its travel, and means for driving said belt continuously beneath said slot and past the waste removing means.

2. A poultry scalder comprising a bottomed spray cabinet, means carried in said cabinet for directing sprays of scalding liquid against poultry disposed in said cabinet, said cabinet having a relatively narrow, elongated slot formed through the bottom thereof, a relatively broad endless screen belt carried beneath said cabinet and having a reach adapted to travel continuously beneath and parallel to said slot, liquid draining from said cabinet being adapted to pass through said slot and said screen for the removal of waste material therefrom, means for directing sprays of water outwardly through said belt at a point spaced outwardly from the end of said slot, whereby said waste material is removed from said screen, and means for driving said belt continuously beneath said slot and past the waste removing means.

3. A poultry scalder comprising a spray cabinet, means carried in said cabinet for directing sprays of scalding liquid against poultry disposed in said cabinet, an endless screen belt carried by said cabinet and having a substantially horizontal upper reach adapted to move continuously beneath said cabinet and through which liquid draining from said cabinet is adapted to pass for the removal of waste material therefrom, a tank disposed between the upper and lower reaches of said belt and adapted to receive said liquid after it has passed through said screen, means for recirculating said liquid from said tank to said spray means, means for directing sprays of water outwardly through the lower reach of said belt, whereby said waste material is discharged downwardly from said screen, and means for driving said belt continuously beneath said cabinet and past the waste discharge means.

4. A poultry scalder comprising a bottomed spray cabinet, means carried in said cabinet for directing sprays of scalding liquid against poultry disposed in said cabinet, said cabinet having a relatively narrow, elongated slot formed through the bottom thereof, a relatively broad endless screen belt carried beneath said cabinet and having a substantially horizontal upper reach adapted to travel continuously beneath and parallel to said slot, liquid draining from said cabinet through said slot being adapted to pass through said screen for the removal of waste material therefrom, a tank disposed between the upper and lower reaches of said belt and adapted to receive said liquid, means for recirculating said liquid from said tank to said spray means, means for directing sprays of water outwardly through the lower reach of said belt, whereby said waste material is discharged downwardly from said screen for suitable disposal, and means for driving said belt continuously beneath said slot and past the waste discharging means.

5. In a poultry scalder of the class described having a cabinet through which poultry is moved by a suitable conveyor, means carried by said cabinet for directing thin, sheet-like sprays of scalding liquid against said poultry as it moves through said cabinet, said sprays being located in planes inclined relative to the direction of travel of said poultry.

6. In a poultry scalder of the class described having a cabinet through which poultry is moved horizontally by a suitable conveyor, nozzles carried in said cabinet and disposed at each side of the line of travel of said poultry for directing thin, sheet-like sprays of scalding liquid inwardly against said poultry as it moves through said cabinet, said sprays being located in planes inclined vertically relative to the direction of travel of said poultry, and said planes of the sprays at opposite sides of the poultry being inclined in opposite directions from the vertical.

GORDON W. JOHNSON.

REFERENCES CITED

The following references are of record in the file of this patent:

UNITED STATES PATENTS

| Number | Name | Date |
| --- | --- | --- |
| 1,130,015 | Paul | Mar. 2, 1915 |
| 1,146,589 | Morrison | July 13, 1915 |
| 1,354,049 | Linton | Sept. 28, 1920 |
| 2,114,893 | Webb | Apr. 19, 1938 |